(12) United States Patent
Seidel

(10) Patent No.: US 7,497,501 B2
(45) Date of Patent: Mar. 3, 2009

(54) ERGONOMIC OPERATOR COMPARTMENT ACCESS SYSTEM AND METHOD

(75) Inventor: Wolfgang R. Seidel, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/642,211

(22) Filed: Dec. 20, 2006

(65) Prior Publication Data
US 2008/0150325 A1 Jun. 26, 2008

(51) Int. Cl.
*B60J 7/00* (2006.01)
(52) U.S. Cl. ................................ 296/146.4
(58) Field of Classification Search ............. 296/146.4; 292/DIG. 23, DIG. 25, DIG. 37, DIG. 67, 292/DIG. 72
See application file for complete search history.

(56) References Cited

U.S. PATENT DOCUMENTS

| | | | | |
|---|---|---|---|---|
| 3,094,352 A | * | 6/1963 | May | 296/155 |
| 3,360,295 A | * | 12/1967 | Reynolds | 296/190.04 |
| 3,410,599 A | * | 11/1968 | Kettler | 296/190.1 |
| 3,747,273 A | * | 7/1973 | Johnson | 49/394 |
| 3,802,530 A | * | 4/1974 | Purcell et al. | 180/89.12 |
| 3,982,601 A | * | 9/1976 | Williams | 180/89.12 |
| 4,049,305 A | * | 9/1977 | Zetterlund et al. | 292/336.3 |
| 4,416,486 A | * | 11/1983 | McNaught et al. | 296/190.11 |
| 4,609,216 A | * | 9/1986 | Baker et al. | 292/262 |
| 4,957,324 A | * | 9/1990 | Doescher et al. | 296/190.11 |
| 5,609,065 A | * | 3/1997 | Brewer et al. | 74/528 |
| 5,655,414 A | * | 8/1997 | Brewer et al. | 74/500.5 |
| 5,655,798 A | * | 8/1997 | Kaveney et al. | 292/3 |
| 6,027,131 A | * | 2/2000 | Wijlhuizen | 280/166 |
| 6,344,642 B1 | * | 2/2002 | Agam et al. | 250/221 |
| 7,034,655 B2 | * | 4/2006 | Magner et al. | 340/5.54 |
| D531,647 S | * | 11/2006 | Stender et al. | D15/30 |
| 7,281,753 B2 | * | 10/2007 | Curtis et al. | 296/146.1 |
| 2004/0055345 A1 | * | 3/2004 | Moore | 70/257 |
| 2006/0028053 A1 | * | 2/2006 | Turnbull et al. | 296/190.08 |

FOREIGN PATENT DOCUMENTS

| | | |
|---|---|---|
| EP | 1001094 | 5/2000 |
| EP | 1619076 | 1/2006 |
| NL | 1004662 | 6/1998 |
| WO | WO 98/40241 | 9/1998 |

* cited by examiner

*Primary Examiner*—Joseph D Pape
(74) *Attorney, Agent, or Firm*—Richard K. C. Chang, II; Liell & McNeil

(57) ABSTRACT

An ergonomic operator compartment access system may be deployed on a machine having an operator compartment. The ergonomic operator compartment access system may include a door to the operator compartment having an open position and a closed position and an actuator connected to the door for moving the operator compartment from a closed position to the open position. Additionally, the ergonomic operator compartment access system may include a plurality of vertically separated steps disposed on the machine beneath the door, and an operator input unit attached to the machine. The operator input unit may be disposed beneath the door and adjacent the plurality of vertically separated steps. The operator input unit may be configured to receive an input and cause the actuator to move the door from the closed position to the open position.

20 Claims, 3 Drawing Sheets

ERGONOMIC OPERATOR COMPARTMENT ACCESS SYSTEM AND METHOD

TECHNICAL FIELD

This invention relates generally to a system and method for ergonomically accessing an operator compartment of a machine.

BACKGROUND

Machines, such as skid steer loaders, multi-terrain loaders, backhoe loaders, agricultural tractors, track-type tractors, articulated trucks, wheel loaders, and other types of construction, mining, or agricultural machinery are used for a variety of tasks requiring operator control. Typically, an operator controls these machines from an operator compartment.

Access to the operator compartment positioned above ground of tall machines is generally provided via steps, an access platform, a manually operated door, and a door latch. Typically, an operator accesses the operator compartment by climbing the steps to the access platform. Then, the operator unlocks the door and moves out of the way of the door. Moving out of the way of the door on the access platform often causes the operator to take an awkward position on the access platform in order to permit the door to be fully opened. Once the door is opened, the operator enters the operator compartment of the machine.

The present invention is directed to overcome one or more of the problems as set forth above.

SUMMARY OF THE INVENTION

In one example of the present invention, an ergonomic operator compartment access system is provided. The ergonomic operator compartment access system may be deployed on a machine having an operator compartment. The ergonomic operator compartment access system may include a door to the operator compartment having an open position and a closed position and an actuator connected to the door for moving the operator compartment from the closed position to the open position. A plurality of vertically separated steps may be disposed on the machine beneath the door and an operator input unit may be attached to the machine beneath the door and adjacent the plurality of vertically separated steps. The operator input unit may be configured to receive an input and cause the actuator to move the door from the closed position to the open position.

The ergonomic operator compartment access system may also include a door latch having a latched position and an unlatched position. In this embodiment, the operator input unit may be configured to receive the input and cause the door latch to be placed in the unlatched position.

The ergonomic operator compartment access system may also include a manual override system disposed adjacent to the door or on the door. The manual override system may be actuated to move the door latch to the unlatched position permitting the door to be moved to the open position.

A method for operating the ergonomic operator compartment access system may include the steps of receiving an input into the operator input unit and sending a signal to move the door from the closed position to the open position. Further, the method may include the step of operating the actuator to move the door from the closed position to the open position.

DETAILED DESCRIPTION

Figure 1:
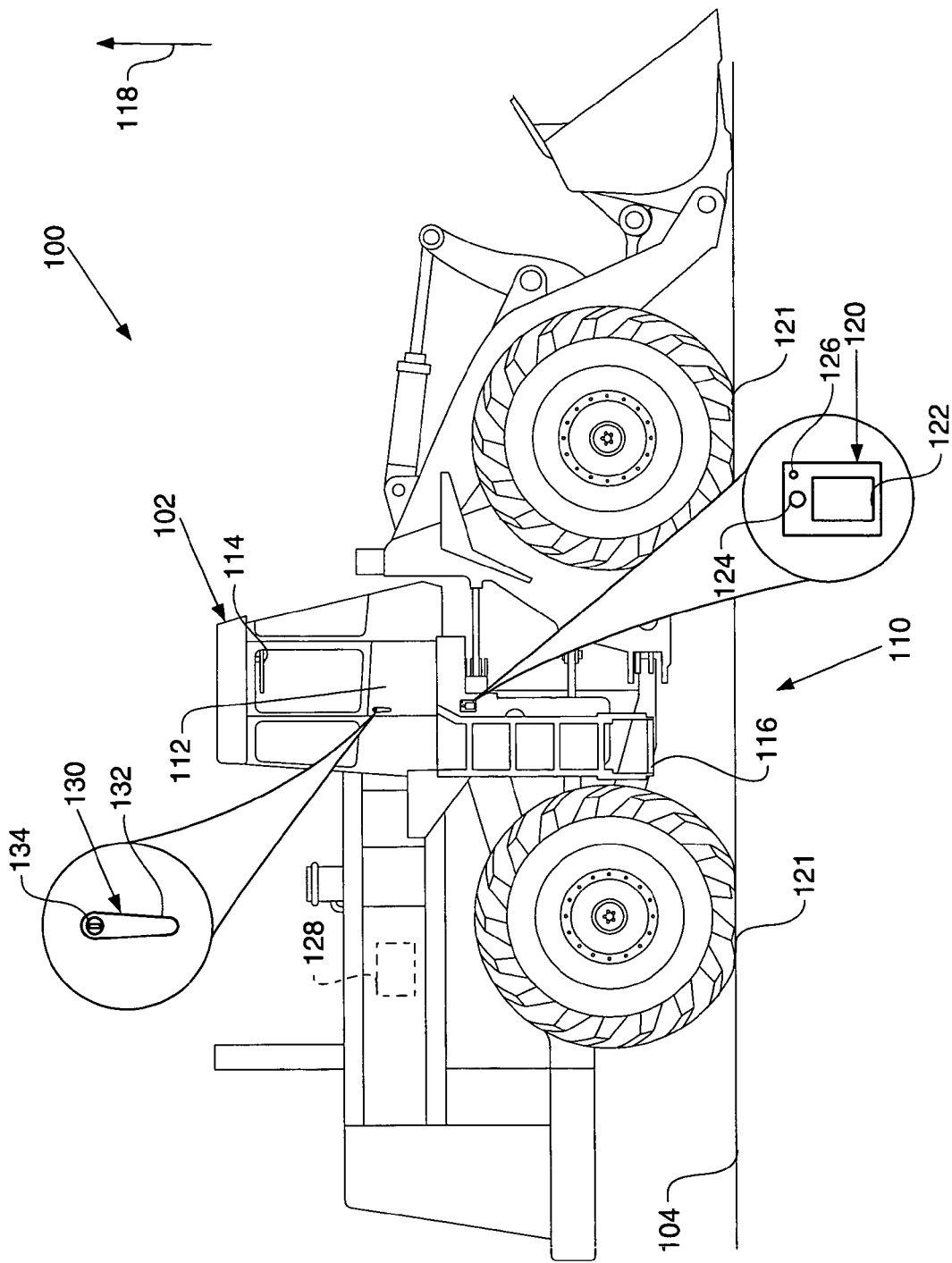
FIG. 1 is a side elevation view of a machine having an ergonomic operator compartment access system.

Referring to FIG. 1, a side elevation view illustrates a machine 100 having an operator compartment 102 and an ergonomic operator compartment access system 110 deployed on the machine 100. The machine 100 may be a wheel loader, a backhoe loader, an agricultural tractor, a track-type tractor, an articulated truck, and other types of construction, mining, or agricultural machinery known in the art having an operator compartment that may be disposed above ground level 104.

The ergonomic operator compartment access system 110 may include a door 112 to the operator compartment 102 and an actuator 114 connected to the door 112 for moving the door from a closed position to an open position. The actuator 114 may also be connected to the machine 100 and may be connected to the operator compartment 102. The actuator 114 may be an electrical motor, pneumatic actuator, hydraulic piston, a compressed spring, or any other actuator known in the art that may be used to provide a force for opening the door 112.

A plurality of vertically separated steps 116 disposed on the machine 100 beneath the door 112. The plurality of vertically separated steps 116 may be a staircase formed on the machine 100, a ladder, hand and foot holds, or any other structure known in the art that permits an operator to move vertically 118 on a machine 100 to reach the operator compartment 102 from ground level 104.

The ergonomic operator compartment access system 110 may include an operator input unit 120 attached to the machine 100 beneath the door 112 and adjacent the plurality of vertically separated steps 116. The operator input unit 120 may be disposed so that an operator may access it from ground level 104. For example, the operator input unit 120 may be disposed on the machine 100 at a height 119 between three and eight feet above a bottommost surface 121 of the machine 100. In some cases, the operator input unit 120 may be disposed on the machine between three and six feet or four and six feet above the bottommost surface 121 of the machine 100. The bottommost surface 121 may be the surface of a ground-engaging member of the machine 100, such as a wheel or track, which engages the ground level 104.

The operator input unit 120 may be configured to receive an input from an operator and cause the actuator 114 to move the door 112 from the closed position to the open position. For example, the operator input unit 120 may include a radio frequency identification (RFID) scanner 122, a keypad (shown in FIG. 3A), or a keyhole (shown in FIG. 3B). Consequently, an operator may pass a badge near the RFID scanner 122, type in a pass code, or turn a key to actuate the operator input unit 120.

Additionally, the operator input unit 120 may include a power saver device 124, such as a button or switch that may be actuated in order to electrically connect the ergonomic operator compartment access system 110 and/or the operator input unit 120 to a power source 128 such as the machine's 100 battery and thus, provide power to the ergonomic operator compartment access system 110 and/or the operator input unit 120 for a predetermined time. Consequently, the ergonomic operator compartment access system 110 and/or the operator input unit 120 may be kept in an unpowered state to remove the power drain on the machine's 100 battery. The power saver device 124 may permit a capacitor (not shown) to be charged from the power system of the machine when it has been turned off. The capacitor may then be used to power the ergonomic operator compartment access system 110 and/or the operator input unit 120. Alternatively, the power saver device 124 may simply connect the ergonomic operator compartment access system 110 and/or the operator input unit 120 to the machine's 100 battery to obtain power directly.

The operator input unit 120 may also include an indicator 126 for indicating to an operator that the operator input unit 120 is currently being powered. The indicator 126 may include any light-producing device such as a light emitting diode.

The ergonomic operator compartment access system 110 may optionally include manual override system 130 may be disposed adjacent to the door 112 or on the door 112. The manual override system 130 permits an operator to open the door 112 when the ergonomic operator compartment access system 110 is not being powered. For example, when the batteries of the machine 100 are dead, the ergonomic operator compartment access system 110 may not function properly so manual override system 130 may be actuated to permit the door 112 to be moved to the open position and allow access to the operator compartment 102.

The manual override system 130 may include a door handle 132 and a keyhole 134 for receiving a key (not shown) that may be turned to unlock the door 112. Because the manual override system 130 may be positioned near the door 112, an operator forgetting to use the operator input unit 120 and having already climbed the plurality of vertically separated steps 116 may still open the door 112 without having to climb down and use the operator input unit 120.

Figure 2:
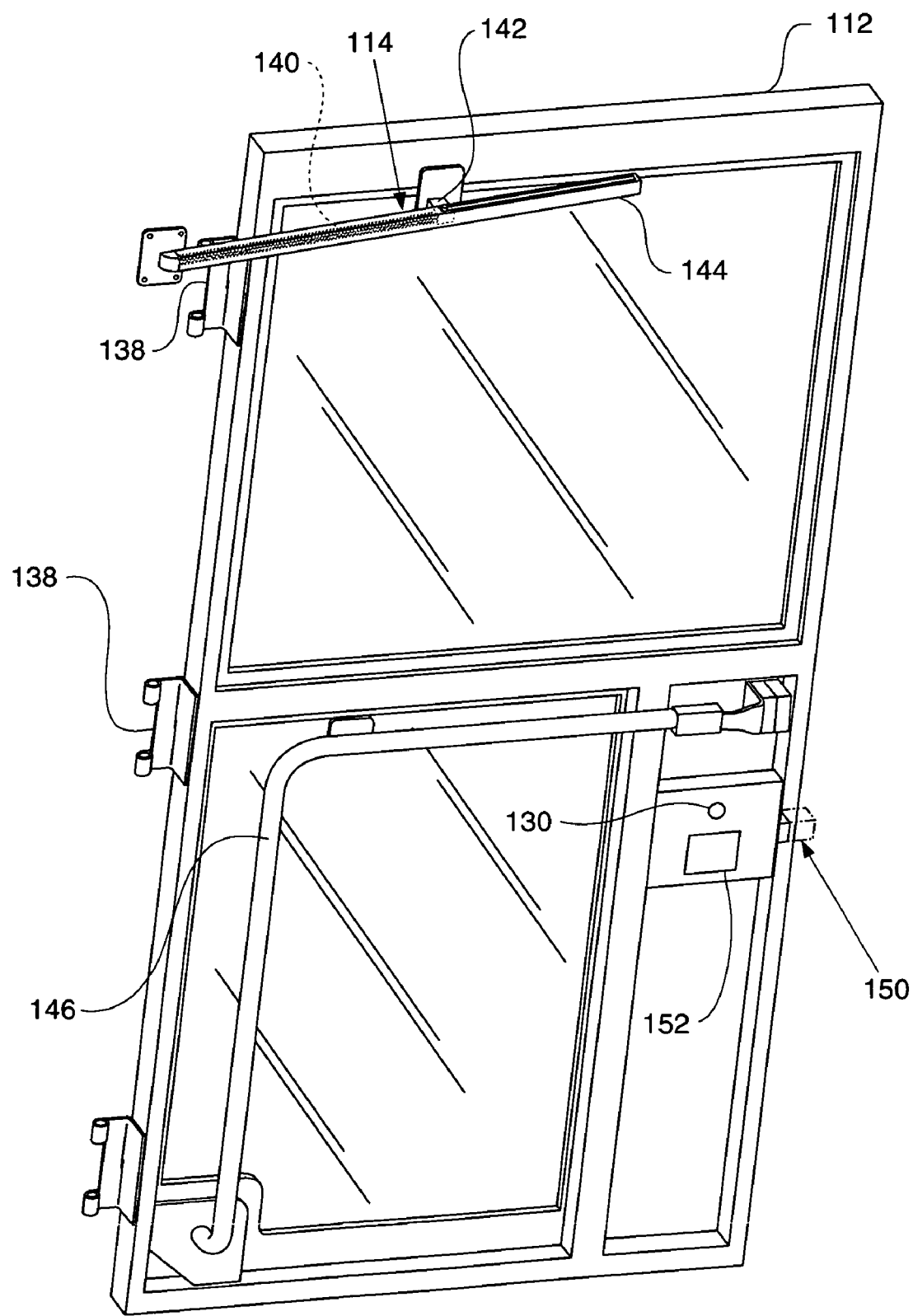
FIG. 2 is a perspective view of the door, actuator, and latch of the ergonomic operator compartment access system of FIG. 1.

Referring to FIG. 2, the door 112 of FIG. 1 is more clearly illustrated. As shown, the door 112 may be pivotally attached to machine 100 by hinges 138 and the actuator 114. The actuator 114 may include a spring 140 that may be compressed when the door 112 is in closed position. Upon actuation of the actuator 114, the spring 140 may be uncompressed to move the door 112 from the closed position to the open position. The spring 140 may move the door 112 from the closed position to the open position by pushing against a slider 142 of the actuator 114 that is attached to the door 112. As shown, the slider 142 slides within a track 144.

The door 112 may also include an arm rail 146 and a door latch 150 having a latched position (shown in phantom) and an unlatched position. As shown, the door latch 150 may be attached to the door 112. Of course, the door latch 150 and the manual override system 130 may be attached to the machine 100 to engage the door 112.

The door latch 150 may include a solenoid 152 that may receive a signal from the operator input unit 120 that causes the door latch 150 to be placed in the unlatched position. When in the unlatched position, the door latch 150 permits the compressed spring 140 to freely act upon the door 112 to move the door 112 to the open position with the energy stored in the compressed spring 140.

The door latch 150 may be connected to the manual override system 130, which is acting as a pivot for the door latch 150. When the manual override system 130 is actuated, the door latch 150 may pivot about the manual override system 130 to be placed in the unlatched position.

Figure 3A:
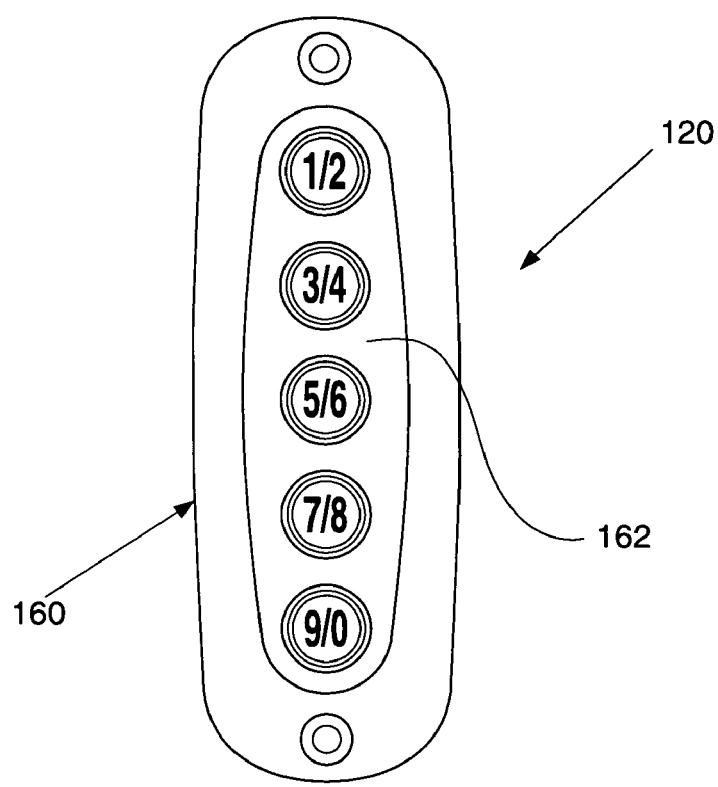
FIGS. 3A and 3B illustrate operator input units for actuating the ergonomic operator compartment access system.

Referring to FIG. 3A, an operator input unit 160 is illustrated that may include a keypad 162. The keypad 162 permits a pass code to be entered that includes a plurality of keystrokes to actuate the ergonomic operator compartment access system 110 of FIG. 1.

Figure 3B:
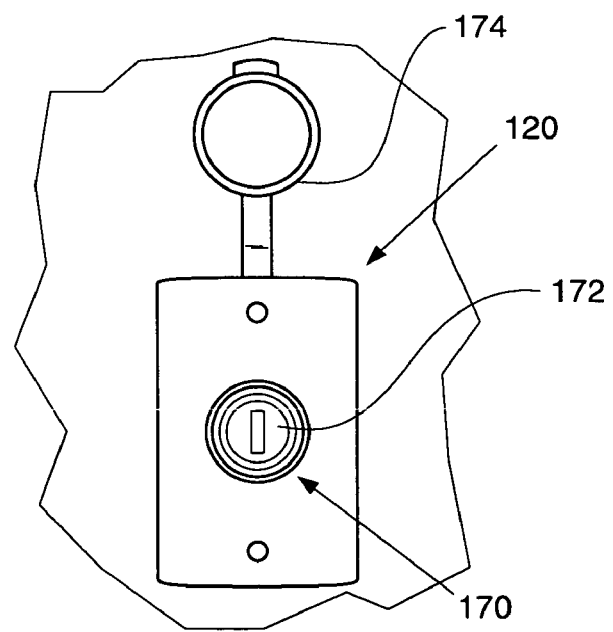

Referring to FIG. 3B, an operator input unit 170 is illustrated that may include a keyhole 172 for receiving a key (not shown) that may be used to actuate the ergonomic operator compartment access system 110 of FIG. 1. A cover 174 may be used to protect the keyhole 172 during inclement weather.

INDUSTRIAL APPLICABILITY

The ergonomic operator compartment access system 110 discussed above may permit an operator to open a door 112 to an operator compartment of a machine while standing on the ground. Consequently, the operator can focus on climbing the plurality of vertically separated steps and enter the operator compartment 102 through the open door 112. Additionally, the operator can avoid being put in the awkward position of moving out of the way of the door 112 while trying to open it.

To achieve this end, the ergonomic operator compartment access system 110 may be operated by connecting the ergonomic operator compartment access system 110 to the power source 128 of the machine 100 and indicating that the ergonomic operator compartment access system 110 is currently being powered. An input may be received into the operator input unit 120, 160, 170, which may send a signal to move the door 112 from the closed position to the open position. The input may be a plurality of keystrokes entered by the operator into the keypad 162 of the operator input unit 160. The input may also be the positioning of an RFID chip within scanning range of the RFID scanner of the operator input unit 120 or the turning of a key in the keyhole 172 of the operator input unit 170.

In some configurations, the signal may be sent to the solenoid 152 to actuate the door latch 150 to move to an unlatched position.

Once the door 112 is unlatched, the actuator 114 may be actuated to move the door from the closed position to the open position. Where the actuator includes a compressed spring 140, the spring 140 may uncompress to force the door 112 into the open position.

It will be apparent to those skilled in the art that various modifications and variations can be made without departing from the scope or spirit of the invention. Additionally, other embodiments of the invention will be apparent to those skilled in the art from consideration of the specification and practice of the invention disclosed herein. It is intended that the specification and examples be considered as exemplary only.

What is claimed is:

1. An ergonomic operator compartment access system deployed on a machine having an operator compartment comprising:

a door to the operator compartment having an open position and a closed position, wherein the open position permits the operator to enter the operator compartment;

an actuator connected to the door for moving the door from the closed position to the open position;

a plurality of vertically separated steps disposed on the machine beneath the door; and an operator input unit attached to the machine, wherein the operator input unit is disposed beneath the door and adjacent the plurality of vertically separated steps, wherein the operator input unit is configured to receive an input and cause the actuator to move the door from the closed position to the open position.

2. The ergonomic operator compartment access system of claim 1, further comprising a door latch having a latched position and an unlatched position, wherein the operator input unit is configured to receive the input and cause the door latch to be placed in the unlatched position.

3. The ergonomic operator compartment access system of claim 1, wherein the operator input unit includes an indicator indicating whether the ergonomic operator compartment access system is being powered.

4. The ergonomic operator compartment access system of claim 1, wherein the actuator includes a spring compressed when the door is in the closed position, wherein upon actuation of the actuator, the spring is uncompressed to move the door from the closed position to the open position.

5. The ergonomic operator compartment access system of claim 1, wherein the operator input unit includes a keypad.

6. The ergonomic operator compartment access system of claim 1, wherein the operator input unit includes an RFID scanner.

7. The ergonomic operator compartment access system of claim 1, wherein the operator input unit includes a power saver device temporarily connects the ergonomic operator compartment access system to a power source of the machine.

8. The ergonomic operator compartment access system of claim 1, wherein the operator input unit is disposed on the machine between three and eight feet above a bottommost surface of the machine.

9. The ergonomic operator compartment access system of claim 8, wherein the operator input unit is disposed on the machine between four and six feet above the bottommost surface of the machine.

10. The ergonomic operator compartment access system of claim 1, further comprising a manual override system disposed adjacent to the door or on the door that is actuated to permit the door to be moved to the open position.

11. The ergonomic operator compartment access system of claim 10, wherein the manual override system includes a keyhole.

12. An ergonomic operator compartment access system deployed on a machine having an operator compartment comprising:
    a door to the operator compartment having an open position and a closed position, wherein the open position permits the operator to enter the operator compartment;
    an actuator connected to the door for moving the door from the closed position to the open position;
    a plurality of vertically separated steps disposed on the machine beneath the door;
    a door latch having a latched position and an unlatched position;
    an operator input unit attached to the machine, wherein the operator input unit is disposed beneath the door and adjacent the plurality of vertically separated steps, wherein the operator input unit is configured to receive an input and cause the door latch to be placed in the unlatched position and cause the actuator to move the door from the closed position to the open position; and
    a manual override system disposed adjacent to or on the door that is actuated to move the door latch to the unlatched position permitting the door to be moved to the open position.

13. The ergonomic operator compartment access system of claim 12, wherein the actuator includes a spring compressed when the door is in the closed position, wherein upon actuation of the actuator, the spring is uncompressed to move the door from the closed position to the open position.

14. The ergonomic operator compartment access system of claim 12, wherein the operator input unit includes an indicator indicating whether the ergonomic operator compartment access system is being powered.

15. The ergonomic operator compartment access system of claim 12, wherein the operator input unit includes a keypad.

16. The ergonomic operator compartment access system of claim 12, wherein the operator input unit includes a power saver device temporarily connects the ergonomic operator compartment access system to a power source of the machine.

17. A method for operating an ergonomic operator compartment access system deployed on a machine having an operator compartment, the ergonomic operator compartment access system including a door to the operator compartment having an open position and a closed position, wherein the open position permits the operator to enter the operator compartment, an actuator connected to the door for moving the door from the closed position to the open position, a plurality of vertically separated steps disposed on the machine beneath the door, and an operator input unit attached to the machine, wherein the operator input unit is disposed beneath the door and adjacent the plurality of vertically separated steps, the method comprising:
    receiving an input into the operator input unit;
    sending a signal to move the door from the closed position to the open position; and
    operating the actuator to move the door from the closed position to the open position.

18. The method of claim 17, wherein the ergonomic operator compartment access system includes a door latch having a latched position and an unlatched position, wherein the signal causes the door latch to be placed in the unlatched position.

19. The method of claim 17, wherein the operator input unit includes a power saver device, the method further comprising the step of actuating the power saver device to temporarily connect the ergonomic operator compartment access system to a power source of the machine.

20. The method of claim 17, wherein the operator input unit includes an indicator, the method further including the step of indicating whether the ergonomic operator compartment access system is being powered.

* * * * *